April 18, 1944.   O. R. BRINEY, JR   2,346,724
TOOL SLIDE SUPPORTING STRUCTURE
Filed Nov. 4, 1942   3 Sheets-Sheet 1

INVENTOR.
OTTIS R. BRINEY, JR.
BY
ATTORNEYS.

April 18, 1944.  O. R. BRINEY, JR  2,346,724
TOOL SLIDE SUPPORTING STRUCTURE
Filed Nov. 4, 1942   3 Sheets-Sheet 2

INVENTOR.
OTTIS R. BRINEY, JR.
BY
ATTORNEYS.

April 18, 1944.  O. R. BRINEY, JR  2,346,724
TOOL SLIDE SUPPORTING STRUCTURE
Filed Nov. 4, 1942  3 Sheets-Sheet 3

INVENTOR.
OTTIS R. BRINEY, JR.
BY
ATTORNEYS.

Patented Apr. 18, 1944

2,346,724

UNITED STATES PATENT OFFICE 2,346,724

TOOLSLIDE SUPPORTING STRUCTURE

Ottis R. Briney, Jr., Pontiac, Mich.

Application November 4, 1942, Serial No. 464,458

2 Claims. (Cl. 51—95)

This invention relates broadly to machine tools and more specifically to improvements in machines of the type having a reciprocable table or tool slide mounted thereon. The machine illustrated herein is of the type shown in my copending application Serial No. 443,871, filed May 21, 1942, entitled "Grinding machine."

One of the objects of the invention is to provide an organization of anti-friction bearings arranged to support a reciprocable table and form a guideway therefor.

Another object of the invention is to provide mechanism for adjusting the position of the bearings in such a manner as to alter the direction of movement of the table relative to certain fixed parts of the machine.

Another object of the invention is to provide a set of anti-friction bearings for supporting a reciprocative table and a second set of bearings for guiding the movement thereof, the latter bearings being adjustable laterally to eliminate side play of the table during reciprocation thereof.

Another object of the invention is to provide a table guideway formed from a series of supporting bearings and a series of guiding bearings, the latter being adjustable to shift the table in a horizontal plane and the supporting bearings being adjustable to shift the table in a vertical plane.

Another object of the invention is to provide a table guideway which embodies a series of anti-friction bearings and a second set of anti-friction bearings engaged with beveled flanges on the sides of the table and movable laterally and downwardly to effect transaxial adjustments of the table and impingement of the supporting bearings.

For purpose of illustration the invention is shown herein as associated with a thread grinding machine having a tool slide or grinding wheel table movable towards and away from the work holding spindle embodied therein. It will be understood, however, that the invention is in no wise limited to such machines nor restricted to tool supporting structures since the ways contemplated herein may be employed with equal facility in other types of machines and in mechanisms embodying reciprocable work holding carriages.

Referring to the drawings.

Figure 1:
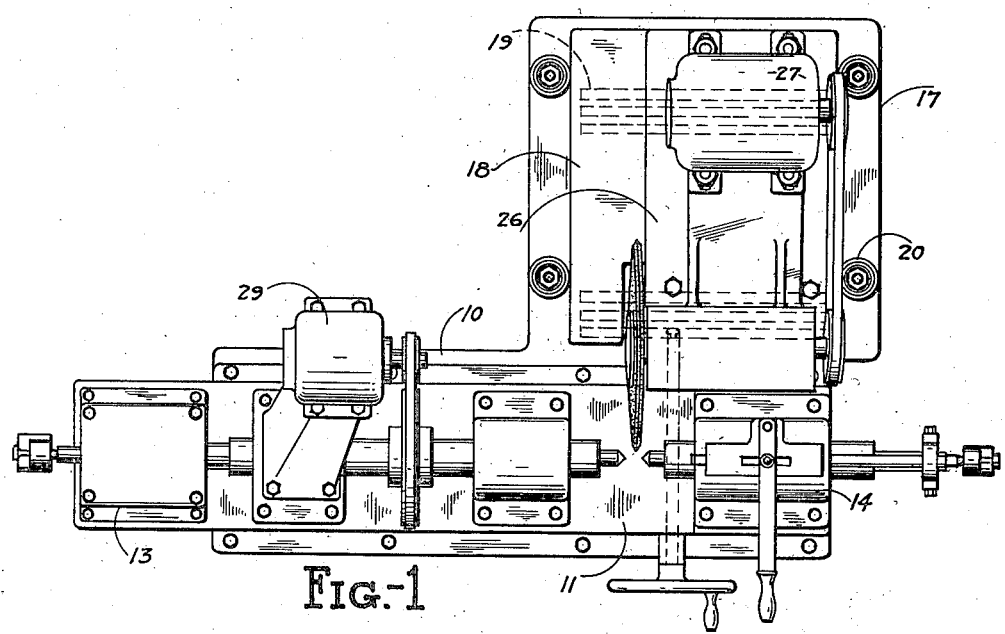
Fig. 1 is a plan view of a thread grinding machine embodying the present invention.
Figure 2:
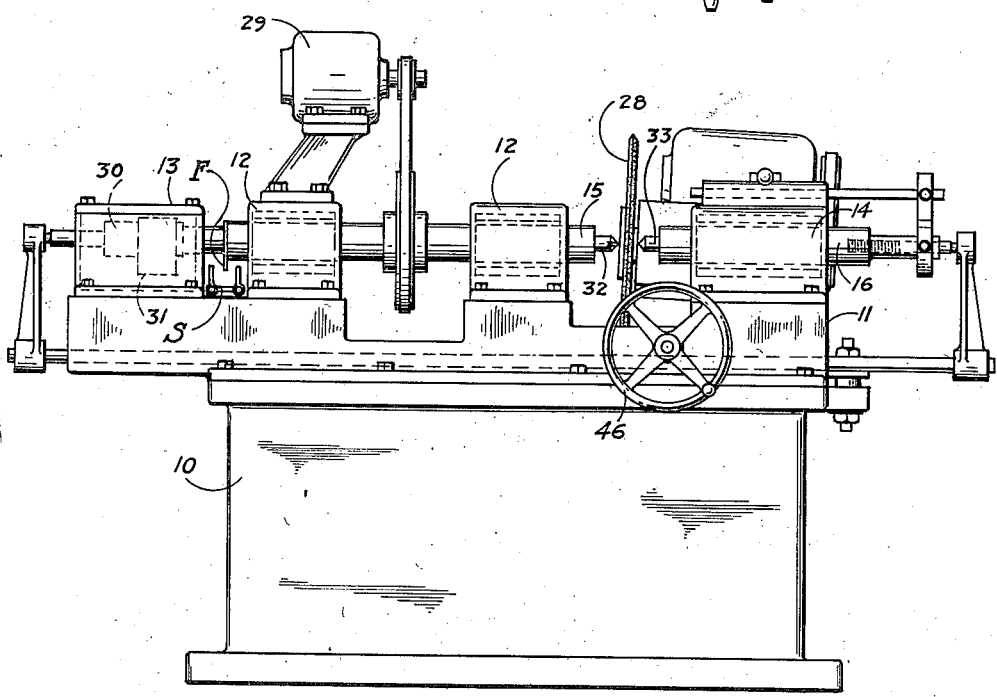
Fig. 2 is a front elevational view thereof.

Referring first to Fig. 1, the machine embodies a base 10 having a bed plate 11 mounted thereon which is machined for the support of a pair of spindle bearing blocks 12, a lead screw bearing block 13 and a foot stock bearing 14, all of which are disposed in coaxial alignment for the support of the spindle 15 and the foot stock spindle 16.

Figure 3:
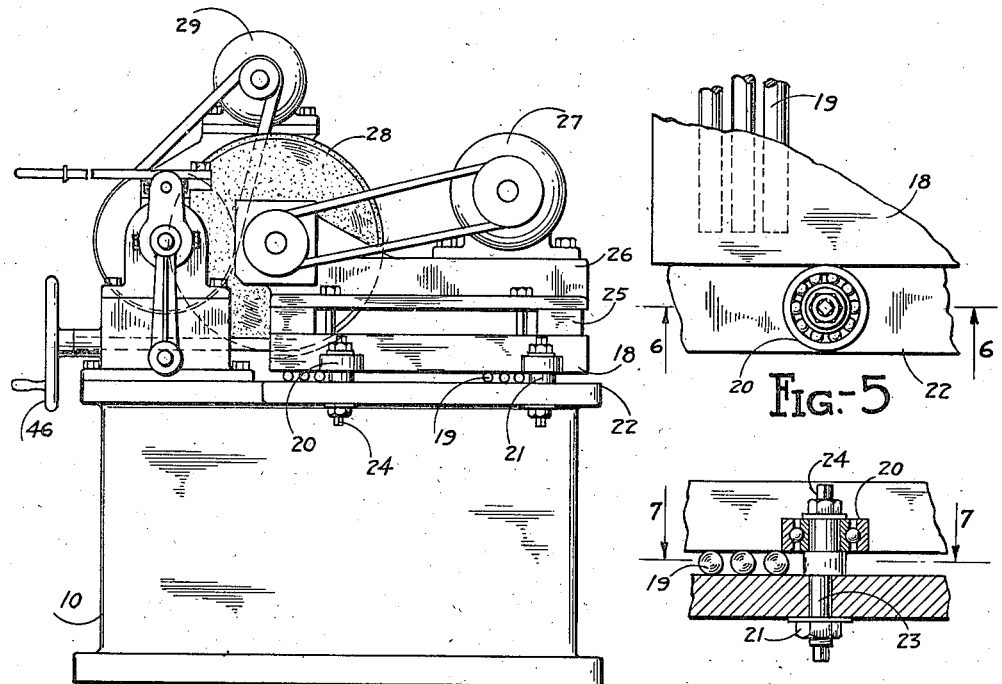
Fig. 3 is an end elevational view of the machine illustrated in Figs. 1 and 2.

The base of the machine is formed with a rearwardly extended bed 17, the upper face of which is planed or slab milled for the support of a grinding wheel slide or table which, as will be seen in Fig. 3, comprises a plate 18 supported upon the bed by rollers 19 and guided thereon normal to the axis of the spindle 15 by anti-friction bearings 20. The bearings 20 are mounted on eccentric bolts 21 retained in the flanges 22 formed in the bed 17. The eccentric bolts or studs for the anti-friction bearings embody shank portions 23 adapted for rotatable adjustment in the bed of the machine and pintles 24 disposed in offset relation to the axis of the shank 23 so that the periphery of the bearings may be drawn into intimate engagement with the side wall of the plate 18 or retracted therefrom.

In practice the eccentric mountings are adjusted so that the anti-friction bearings are forced with appreciable pressure against the side walls of the plate, the eccentrics being tightened after the angular relation of the table relative to the axis of the spindle has been determined.

The upper surface of the plate 18 is finished to receive a pair of bolster blocks 25 which are tapered to position the grinding wheel platen 26 in proper angular relation to the work piece carried by the spindle and foot stock centers. The platen is preferably bolted to the plate 18 to facilitate the ready assembly of bolster blocks tapered for threads of different helical angles and, as shown, the platen is constructed for the support of an electric motor 27 provided as the driving medium for the grinding wheel 28.

The spindle 15 may be driven in the conventional manner through gearing or as shown by a reversible motor 29 mounted upon one of the spindle bearing blocks 12. The motor 29 is operatively controlled through a pair of reversing switches S, which are actuated by a finger F carried by the spindle 15. The outer end of the spindle is formed with a lead screw 30 engaged with a nut 31 retained against axial movement in the bearing block 13. As the spindle is rotated and moved axially under the influence of the lead screw 30 the finger F will alternately engage the switches S and thus cause the reversal of the motor and consequent reciprocative movement of the spindle 15.

Since the structure and operation of the spindle driving mechanism are merely illustrative of a complete type of machine and form per se no part of the present invention, further description thereof is deemed unnecessary herein save that the work pieces are mounted between the live center 32 in the spindle and the dead center 33 in the foot stock and the grinding wheel 28 is mounted for reciprocative movement normal to the axis of the spindle.

With the work thus supported the grinding wheel is brought into and out of engagement therewith by operation of a hand wheel 46 mounted on a feed screw connected with the table 18. A dial indicator mounted on the bed of the machine and engaged with the table is preferably employed to determine the depth of cut and table position therefor. The position of the grinding wheel after dressing is likewise determined by the dial indicator through adjustable stops and graduated feed dials may be employed if desired.

With the table or tool slide structure provided herein it has been found in practice that the bed 17 may be machined by merely rough planing or slab milling the face of the casting engaged by the rollers 19 since alignment of the table is attained through adjustment of the eccentric bolts supporting the anti-friction guide bearings 20. Obviously, with such construction the usual scraping and precision operations attendant the manufacture of ways for V slides or gibed structures may be eliminated and appreciable economies realized without sacrifice in efficiency, durability or accuracy of the machine.

The table structure shown in the modified forms illustrated in Figs. 7 to 12 inclusive contemplates the support of the table through anti-friction ball bearings 60 mounted upon eccentric bolts 61 supported in brackets 62 mounted upon the bed of the machine. The brackets 62 are formed with an angularly disposed boss in the upper portion thereof which is bored for the reception of an eccentric bolt 63 having anti-friction ball bearings 64 on the ends thereof engageable with ribs 65 formed in the lateral lineal side walls of the table 18. The table 26 is pivotally supported adjacent its inner end upon pintles 66 supported in brackets 67 mounted on the plate 18. The opposite side of the table 26 is provided with jack screws 68 having lock nuts 69 thereon to facilitate the securement of the table in its adjusted position. In this embodiment the jack screws 68 are provided in substitution for the bolster blocks 25 to tilt the table angularly to the requisite position for the helix angle of the thread being ground.

In the assembly of the table supporting and guiding structure operative adjustments are obtained by releasing the jam nuts 70 on the eccentric bolts 61, then rotating the bolts until the table is leveled and the grinding wheel suitably disposed in relation to the work, next rotating the eccentric bolts 63 until the table is adjusted normal to the axis of the work, next revolving the bolts until each bearing is impinged with equal pressure against the rail or flange 65, then tightening the jam nuts 70.

Like adjustments compensative of wear may be made from time to time though obviously the improved guideway is susceptible of less wear than the conventional V ways and gibed structures.

Figure 5:
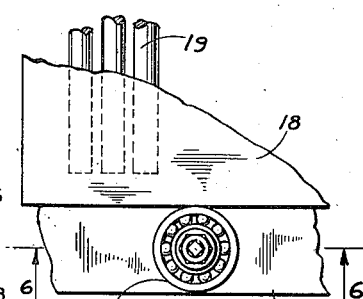
Fig. 5 is a plan view shown upon an enlarged scale of a portion of the slide shown in Fig. 1.
Figure 6:
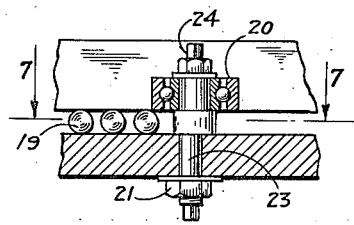
Fig. 6 is a transverse section through a portion of the bed of the machine and slide illustrated in Fig. 5, the section being taken on the plane indicated by the lines 6—6 of Fig. 5.
Figure 7:
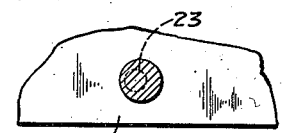
Fig. 7 is a transverse section through the eccentric bolt for supporting the bearing, the section being taken on a plane indicated by the line 7—7 in Fig. 1.
Figure 4:
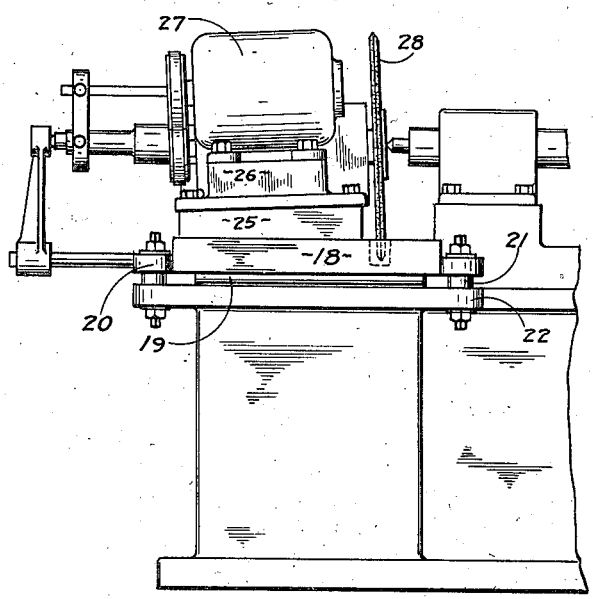
Fig. 4 is a fragmentary portion of a rear elevational view of the machine.
Figure 8:
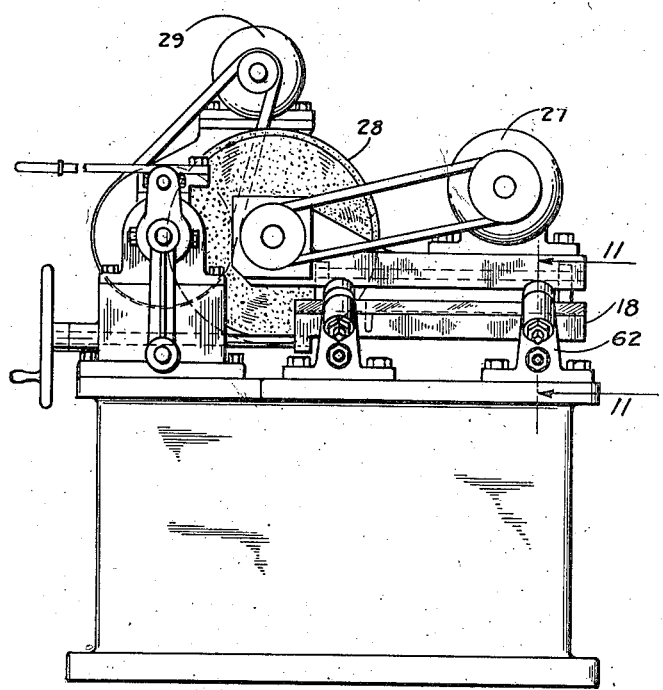
Fig. 8 is an end elevational view of the machine illustrating a modified form of the slide supporting structure.
Figure 11:
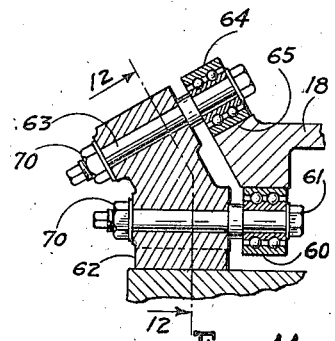
Fig. 11 is a detail view in section of a portion of the modified bearing support, the section being taken on a plane indicated by line 11—11 in Fig. 8.
Figure 12:
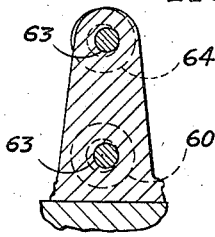
Fig. 12 is a vertical section through the supporting bracket, the section being taken on a plane indicated by the line 12—12 in Fig. 11.
Figure 9:
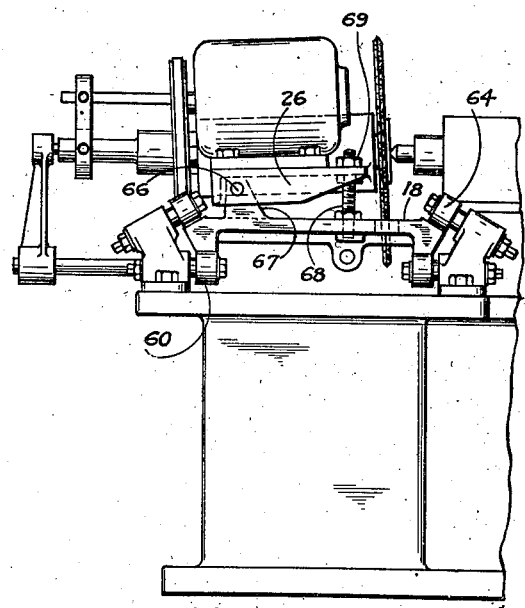
Fig. 9 is a fragmentary portion of a rear elevation of the machine shown in Fig. 8.
Figure 10:
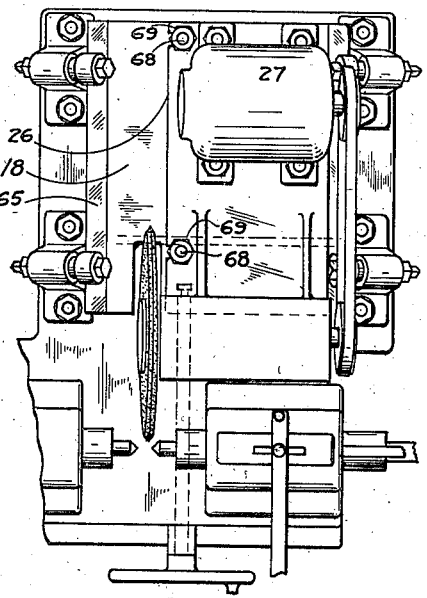
Fig. 10 is a plan view thereof.

In this structure as well as that illustrated in Figs. 5, 6 and 7, it is essential that the bearings be forced into compressive engagement with the sides of the table in order to take up all lost motion or play and eliminate lateral movement of the table.

It will be understood that such substitutive structures as eccentric studs, screw fed brackets and wedge type mountings for the anti-friction bearings are deemed as falling within the scope and spirit of the present invention and further that the guideway contemplated herein is susceptible of application in other environs and for various other uses than that described above.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A thread grinding machine comprising a base, a rectangular plate mounted thereon, anti-friction bearings mounted on said base adjacent the corners of said plate and engaged with the side walls thereof, anti-friction bearings mounted on said base adjacent the corners of said plate and engaged with the lower face thereof, a motor mounted on said plate, a grinding wheel mounted on said plate, driving connections intermediate said motor and said grinding wheel, a spindle bearing affixed upon said base, a work driving spindle therein, a thread on the outer end of said spindle, a nut mounted on said base, and secured against longitudinal movement relative thereto, a motor mounted on said base adjacent said spindle bearing, a laterally yieldable driving connection intermediate said motor and said spindle, a dead center bearing affixed upon said base, a dead center mounted for reciprocation therein, and a screw in said base connected with said plate for moving said grinding wheel towards and away from said spindle, eccentric bolts supporting the anti-friction bearings engaged with the sides of said plate for adjusting the grinding wheel normal to said spindle and eccentric bolts supporting the anti-friction bearings engaged with the lower face of said plate for adjusting the grinding wheel in vertical relation to the axis of said spindle.

2. A thread grinding machine comprising a base, a rectangular plate mounted thereon, anti-friction bearings mounted on said base adjacent the corners of said plate and engaged with the side walls thereof, eccentric bolts supporting said bearings for adjusting the path of movement of said plate, anti-friction bearings intermediate said base and said plate, a motor on said plate, a grinding wheel mounted on said plate operatively connected with said motor, a spindle bearing affixed upon said base, a work driving spindle therein, a thread on said spindle, a nut affixed on said bed and engaged with said thread, a reversible motor mounted on said bed superjacent said spindle, a belt intermediate said motor and said spindle, a pair of switches for reversing said motor mounted on said bed, a trip finger mounted on said spindle intermediate said switches for operating said switches, a foot stock bearing mounted on said bed, a dead center mounted for reciprocation therein and a screw in said bed connected with said plate for moving the grinding wheel towards and away from said spindle.

OTTIS R. BRINEY, Jr.